US012789743B2

(12) United States Patent
Watanabe

(10) Patent No.: US 12,789,743 B2
(45) Date of Patent: Nov. 10, 2026

(54) PASSENGER SEAT AIRBAG DEVICE

(71) Applicant: TOYODA GOSEI CO., LTD., Kiyosu (JP)

(72) Inventor: Shota Watanabe, Aichi (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 19/405,683

(22) Filed: Dec. 2, 2025

(65) Prior Publication Data

US 2026/0159020 A1 Jun. 11, 2026

(30) Foreign Application Priority Data

Dec. 5, 2024 (JP) ................................ 2024-212547

(51) Int. Cl.
*B60R 21/2338* (2011.01)
*B60R 21/16* (2006.01)
*B60R 21/205* (2011.01)

(52) U.S. Cl.
CPC ........ *B60R 21/2338* (2013.01); *B60R 21/205* (2013.01); *B60R 2021/161* (2013.01); *B60R 2021/23382* (2013.01); *B60R 2021/23384* (2013.01)

(58) Field of Classification Search
CPC .... B60R 2021/161; B60R 2021/23382; B60R 2021/23384; B60R 2021/2395; B60R 21/205; B60R 21/2338
See application file for complete search history.

(56) References Cited

U.S. PATENT DOCUMENTS 5,306,043 A * 4/1994 Mihm ................. B60R 21/2338 280/743.2
6,422,597 B1 * 7/2002 Pinsenschaum .. B60R 21/01516 280/743.2
6,773,030 B2 * 8/2004 Fischer ................ B60R 21/233 280/739
6,981,719 B2 * 1/2006 Igawa .................. B60R 21/233 280/743.1

(Continued)

FOREIGN PATENT DOCUMENTS

JP 2002211348 A * 7/2002
JP 2007-230503 A 9/2007

(Continued)

*Primary Examiner* — Laura Freedman
(74) *Attorney, Agent, or Firm* — Posz Law Group, PLC

(57) ABSTRACT

A passenger seat airbag device has an airbag, an inflator, and a control mechanism. The airbag includes a bag main body and regulation members disposed in the bag main body to regulate an inflation shape of the bag main body. Insertion ring portions through which the regulation members are inserted are provided on an inner surface of the bag main body. The insertion ring portions are arranged to be separated from each other in a front-rear direction. The regulation members are arranged to face each other in the up-down direction or the left-right direction, corresponding to the insertion ring portions. Each of the regulation members has a loop portion which couples the respective insertion ring portions by forming a loop shape in a state of being inserted through the respective insertion ring portions separately arranged in the front-rear direction.

2 Claims, 13 Drawing Sheets

(56) References Cited

U.S. PATENT DOCUMENTS

| | | | | |
|---|---|---|---|---|
| 7,261,319 | B2 * | 8/2007 | DePottey | B60R 21/2338 280/739 |
| 7,264,268 | B2 * | 9/2007 | Ehrke | B60R 21/2346 280/743.1 |
| 7,347,450 | B2 * | 3/2008 | Williams | B60R 21/239 280/739 |
| 7,458,607 | B2 * | 12/2008 | Abe | B60R 21/239 280/739 |
| 7,658,407 | B2 * | 2/2010 | Ford | B60R 21/239 280/739 |
| 8,727,378 | B2 * | 5/2014 | Hiruta | B60R 21/239 280/739 |
| 10,723,307 | B2 * | 7/2020 | Morawski | B60R 21/2338 |
| 2007/0205591 | A1 * | 9/2007 | Bito | B60R 21/233 280/743.2 |
| 2011/0309605 | A1 * | 12/2011 | Kumagai | B60R 21/239 280/743.2 |

FOREIGN PATENT DOCUMENTS

| | | | | | |
|---|---|---|---|---|---|
| JP | 2008044594 | A | * | 2/2008 | B60R 21/233 |
| JP | 2009035055 | A | * | 2/2009 | B60R 21/2338 |
| JP | 5342361 | B2 | | 11/2013 | |
| JP | 2017-100578 | A | | 6/2017 | |

* cited by examiner

PASSENGER SEAT AIRBAG DEVICE

CROSS-REFERENCE TO RELATED APPLICATIONS

This application is based on and claims priority under 35 USC 119 from Japanese Patent Application No. 2024-212547 filed on Dec. 5, 2024, the entire content of which is incorporated herein by reference.

TECHNICAL FIELD

The present disclosure relates to a passenger seat airbag device that is disposed in front of an occupant seated in a passenger seat and is configured to control an inflation shape of an airbag by a control mechanism.

BACKGROUND ART

In the related art, as a passenger seat airbag device for controlling inflation of an airbag by a control mechanism, there has been a passenger seat airbag device formed such that a coupling member for coupling a left wall portion and a right wall portion facing each other in a left-right direction is arranged inside an airbag at the time of full inflation, and a center of the coupling member is locked by a locking member provided on a case side. In the passenger seat airbag device of the related art, a width dimension in a front-rear direction of the airbag at the time of full inflation (separation distance from case to occupant-side wall portion disposed on rear end side) is made different between a case where the airbag is inflated in a state where the locking of the center of the coupling member by the locking member is maintained and a case where the airbag is inflated in a state where the locking of the center of the coupling member by the locking member is released (for example, see JP2017-100578A).

However, in the passenger seat airbag device of the related art, the coupling member is formed to couple only one portion in the vicinity of a substantial center in the up-down and front-rear directions of the left wall portion and the right wall portion, and is formed to change the position in the vicinity of the center of the coupling member to change a position of the occupant-side wall portion disposed on an occupant side at the time of full inflation by maintaining or releasing the locking by the locking member, so that it is difficult to stably change a position of the entire occupant-side wall portion that receives the occupant at the time of full inflation, and there is a concern that the occupant-side wall portion is inclined or the like, resulting in that the occupant cannot be stably protected.

SUMMARY OF INVENTION

An object of the present disclosure is to provide a passenger seat airbag device capable of stably protecting an occupant by an airbag fully inflated even when the airbag device is configured to have different inflation modes.

An aspect of the present disclosure relates to a passenger seat airbag device, having:

- an airbag that is disposed in front of an occupant seated in a passenger seat and is folded and stored in a storage portion;
- an inflator that supplies a an inflation gas to the airbag; and
- a control mechanism that controls an inflation shape of the airbag, in which the airbag is configured to include:

- a bag main body formed in a bag shape having flexibility, and configured to have an occupant-side wall portion disposed to face the occupant on a rear end side at a time of full inflation, and a peripheral wall portion extending from a peripheral edge of the occupant-side wall portion and converged toward a front end side, in which an inflow opening for allowing the inflation gas to flow into an inside of the bag main body is arranged on a front end side of the peripheral wall portion, and a peripheral edge of the inflow opening is attached to a side of the storage portion; and
- a regulation member configured to be an elongated body having flexibility, and disposed in the bag main body to regulate an inflation shape of the bag main body, at least two insertion ring portions through which a base end portion of the regulation member enables to be inserted are provided at each of at least two positions facing each other in an up-down direction or a left-right direction, on an inner peripheral surface side of the peripheral wall portion, in which the insertion ring portions provided on one side in the up-down direction or the left-right direction are arranged to be separated from each other in a front-rear direction, at least two of the regulation members are arranged to face each other in the up-down direction or the left-right direction, corresponding to the insertion ring portions, and in each of the regulation members, a loop portion that couples the respective insertion ring portions by forming a loop shape in a state of being inserted through the respective insertion ring portions separately arranged in the front-rear direction is provided on a side of the base end portion, and a distal end portion of the regulation members is coupled to the control mechanism disposed in a vicinity of the inflow opening, and the loop portion is configured,

- when the bag main body is inflated in a state where coupling between the regulation member and the control mechanism is maintained, to pull the insertion ring portions separately arranged in the front-rear direction in a state where adjacent insertion ring portions are close to each other and a portion of the peripheral wall portion disposed between the adjacent insertion ring portions is folded, and
- at the time of full inflation of the bag main body in a state where the coupling between the regulation member and the control mechanism is released, such that the portion of the peripheral wall portion disposed between the adjacent insertion ring portions is deployed in the front-rear direction.

In the passenger seat airbag device according to the aspect, when the coupling between the regulation member and the control mechanism is maintained, the bag main body is fully inflated in the state where the portion of the peripheral wall portion disposed between the adjacent insertion ring portions is folded (such that the adjacent insertion ring portions are close to each other) by the loop portion provided on the side of the base end of the regulation member. That is, in the passenger seat airbag device of the aspect, when the coupling between the regulation member and the control mechanism is maintained, the airbag is fully inflated in a state where tucks are provided along the up-down direction or the left-right direction at an intermediate portion of the peripheral wall portion in the front-rear direction. Since such tucks are formed on both sides of the peripheral wall portion of the bag main body facing each other in the up-down direction or the left-right direction, a width dimension of the peripheral wall portion in the front-rear direction at the time of full inflation can be reduced in a well-balanced manner on both left and right sides or both upper and lower sides, and even in a configuration that the airbag is inflated by providing the tucks on a part of the peripheral wall portion, an occupant-side wall portion disposed on a rear end side at the time of full inflation can be disposed to face the occupant while preventing occurrence of inclination or the like, and the occupant can be stably received. In addition, when the coupling between the regulation member and the control mechanism is released, the bag main body is fully inflated by causing the portion of the peripheral wall portion disposed between the insertion ring portions to be deployed in the front-rear direction (extended in front-rear direction), and thus a position of the occupant-side wall portion at the time of full inflation can be positioned rearward as compared with the case where the airbag is inflated in the state where the coupling between the regulation member and the control mechanism is maintained. Of course, even in the airbag fully inflated in the state where the coupling between the regulation member and the control mechanism is released, the occupant can be stably received by the occupant-side wall portion disposed in front of the occupant.

Therefore, in the passenger seat airbag device of the aspect, even when the airbag device is configured to have different inflation modes, the occupant can be stably protected by the airbag fully inflated.

In the passenger seat airbag device of the aspect, it is preferable that the insertion ring portions are arranged on the inner peripheral surface side of the peripheral wall portion to face each other in the left-right direction. With such a configuration of the passenger seat airbag device, the insertion ring portions can be arranged in a region that does not contact a windshield arranged above the airbag at the time of full inflation or an instrument panel arranged below the airbag, and thus when the airbag is inflated in the state where the coupling between the regulation member and the control mechanism is maintained, the regulation member is not affected by the windshield or the instrument panel, and the tucks can be stably provided in a region of the peripheral wall portion.

BRIEF DESCRIPTION OF DRAWINGS

Exemplary embodiment(s) of the present invention will be described in detail based on the following figures, wherein.

DESCRIPTION OF EMBODIMENTS

Figure 1:
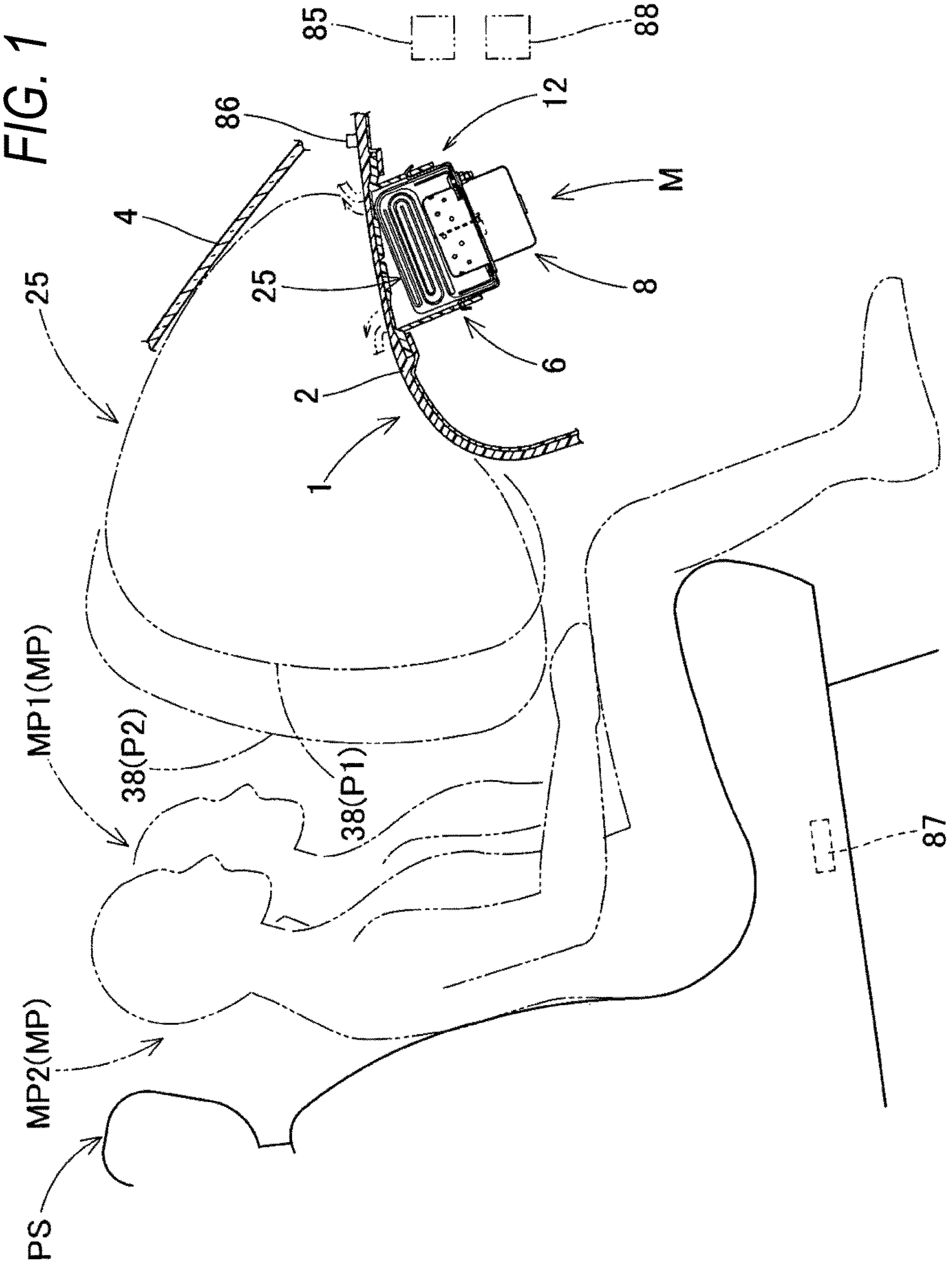
FIG. 1 is a schematic view illustrating the vicinity where a passenger seat airbag device according to an embodiment of the present disclosure is mounted.

Hereinafter, one embodiment of the present disclosure will be described with reference to the drawings. As illustrated in FIG. 1, a passenger seat airbag device M (hereinafter, abbreviated as "airbag device") according to the embodiment is a top mount type disposed inside an upper surface 2 of an instrument panel (hereafter, referred to as "in-panel") 1 in front of a passenger seat PS in a vehicle. In the embodiment, a front-rear direction, an up-down direction, and a left-right direction coincide with a front-rear direction, an up-down direction, and a left-right direction of the vehicle unless otherwise specified.

Figure 2:
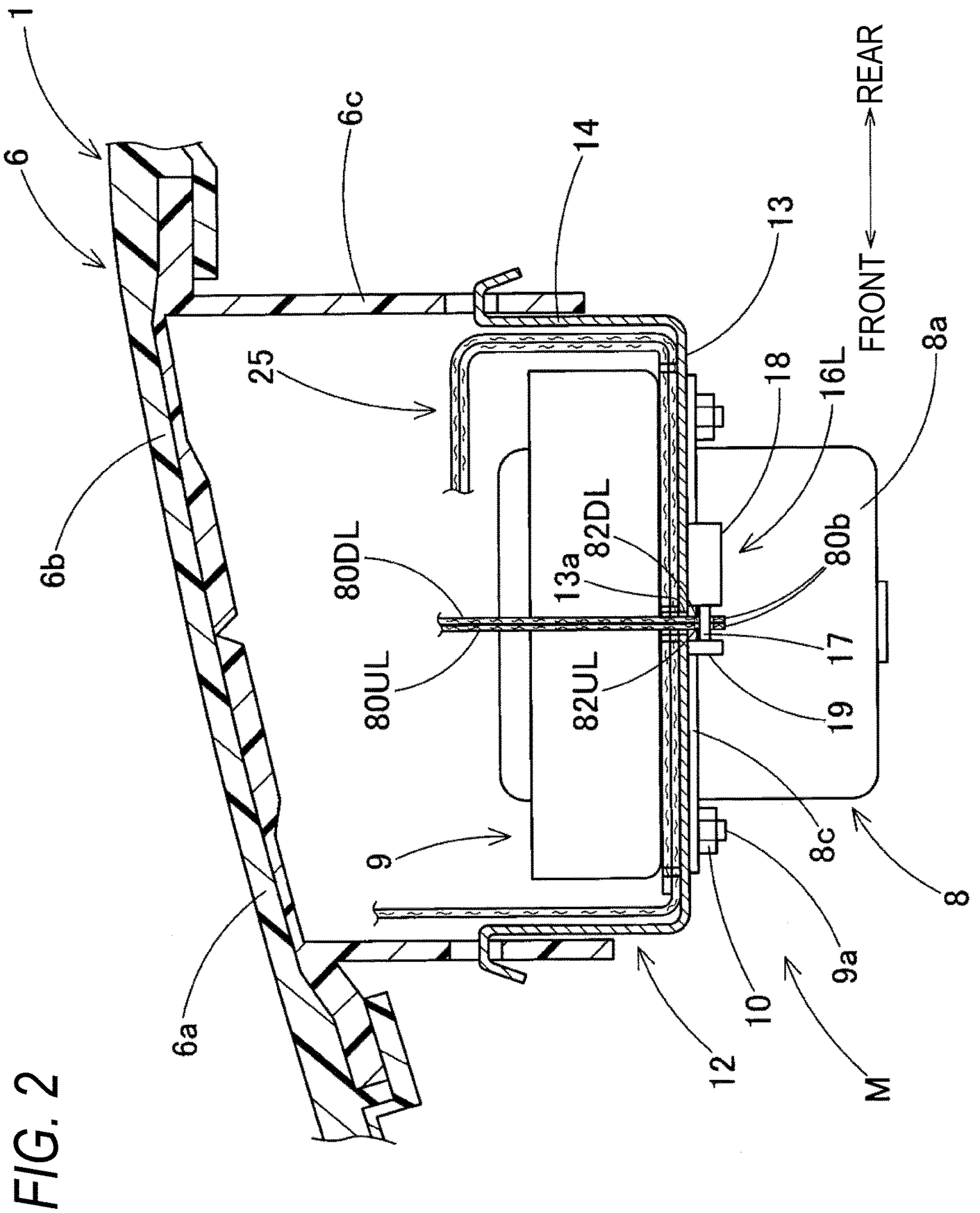
FIG. 2 is a schematic enlarged longitudinal sectional view of the passenger seat airbag device according to the embodiment in a front-rear direction.
Figure 3:
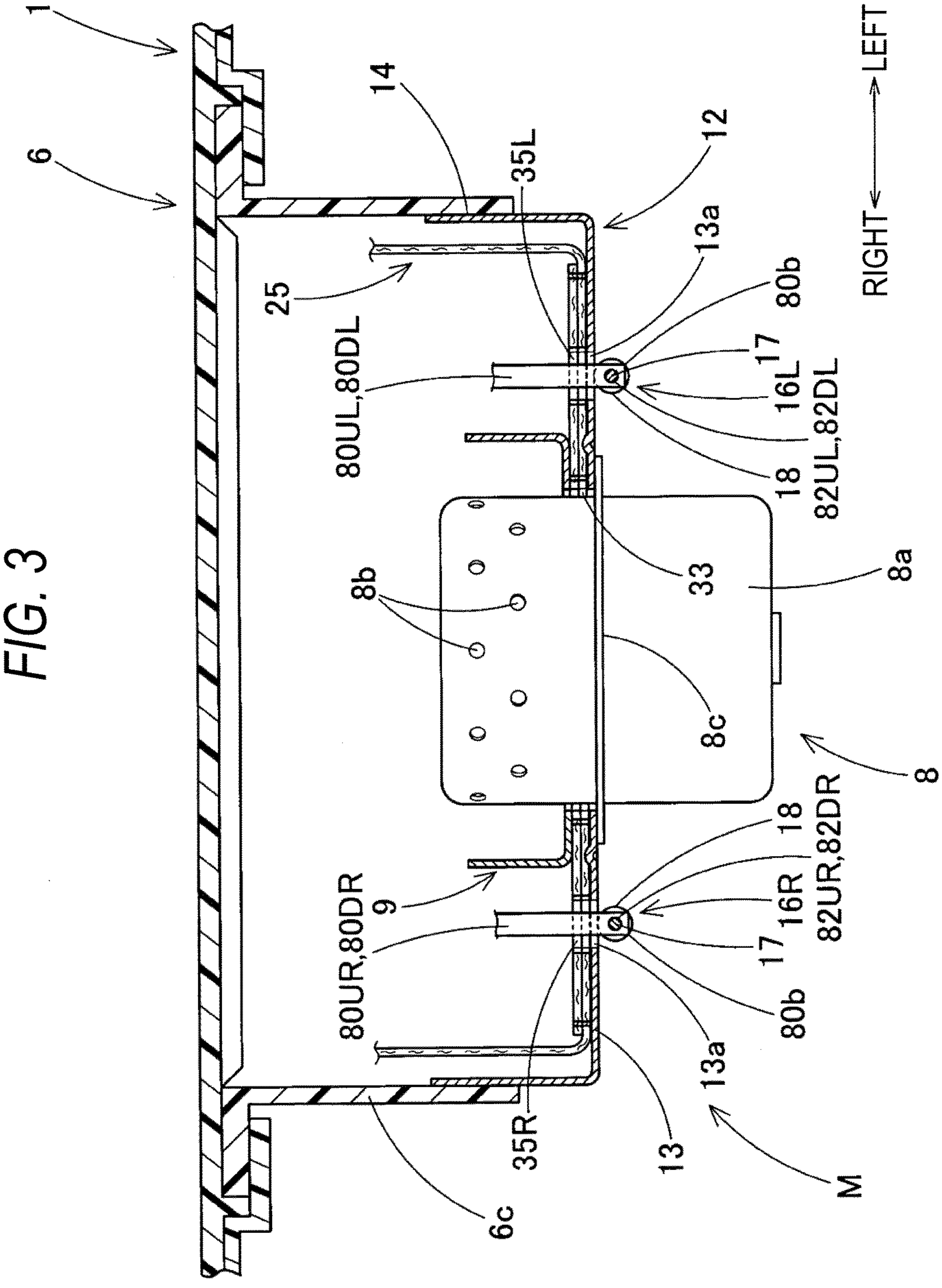
FIG. 3 is a schematic enlarged longitudinal sectional view of the passenger seat airbag device according to the embodiment in a left-right direction.

As illustrated in FIGS. 1 to 3, the airbag device M includes a folded airbag 25, an inflator 8 that supplies an inflation gas to the airbag 25, a case 12 serving as a storage portion that stores and holds the airbag 25 and the inflator 8, a retainer 9 for attaching the airbag 25 and the inflator 8 to the case 12, an airbag cover 6 that covers the folded airbag 25, and two locking members 16L, 16R serving as a control mechanism that controls an inflation mode of the airbag 25. In the case of the embodiment, operations of the inflator 8 and the locking members 16L, 16R are controlled by a control device 85 illustrated in FIG. 1.

As illustrated in FIG. 1, the control device 85 inputs electric signals from a position detection sensor 86 capable of detecting a physique of an occupant MP seated in the passenger seat PS and a separation distance between the in-panel 1 and the occupant MP (position of passenger seat PS with respect to in-panel 1), a weight detection sensor 87 capable of detecting a weight of the occupant MP, a collision detection sensor 88 capable of detecting an acceleration and an acceleration direction of the vehicle, and the like, causes the inflator 8 to operate, and controls operations of the locking members 16L, 16R so as to inflate the airbag 25 in a suitable inflation mode.

The airbag cover 6 is formed integrally with the in-panel 1 made of a synthetic resin, and is configured such that two door portions of front and rear door portions 6a, 6b are pushed open by the airbag 25 when the airbag 25 is deployed and inflated. In addition, a coupling wall portion 12c that is coupled to the case 12 is formed around the door portions 6a, 6b of the airbag cover 6.

As illustrated in FIGS. 1 to 3, the inflator 8 includes a substantially cylindrical main body portion 8a having a plurality of gas discharge ports 8b, and a flange portion 8c for attaching the inflator 8 to the case 12.

The case 12 serving as the storage portion is formed in a substantially rectangular parallelepiped shape made of sheet metal with a rectangular opening at an upper end side, and as illustrated in FIGS. 1 to 3, is provided with a substantially rectangular bottom wall portion 13 into which the inflator 8 is inserted and attached from below, and a peripheral wall portion 14 that extends upward from an outer peripheral edge of the bottom wall portion 13 and locks a coupling wall portion 6c of the airbag cover 6. In the case of the embodiment, the airbag 25 and the inflator 8 are coupled to the bottom wall portion 13 of the case 12 by passing through a peripheral edge of an inflow opening 33 in the airbag 25, the bottom wall portion 13 of the case 12, and the flange portion 8c of the inflator 8 using respective bolts 9a of the retainer 9 disposed in the airbag 25 as an attachment unit and fixing by nuts 10. The bottom wall portion 13 of the case 12 is formed to have a wide width in a left-right direction, and an insertion hole (reference numeral omitted) through which the main body portion 8a of the inflator 8 can be inserted and insertion holes (not illustrated) for allowing the respective bolts 9a of the retainer 9 to be inserted are arranged at a position at substantially the center in the left-right direction. In the bottom wall portion 13, as illustrated in FIG. 3, through holes 13a, 13a are formed on both left and right sides of the insertion hole for allowing the main body portion 8a of the inflator 8 to be inserted. Each of the through holes 13a is for allowing the later-described distal end potions 80b of regulation members 80UL, 80DL and distal end portions 80b of regulation members 80UR, 80DR extending from the airbag 25 to be inserted therethrough. In addition, a bracket (not illustrated) coupled to a body side of the vehicle is arranged in the case 12.

The locking members 16L, 16R serving as the control mechanism are respectively arranged at positions in the vicinity of the respective through holes 13a (that is, on both left and right sides of inflator 8) on a lower portion side of the bottom wall portion 13. The locking members 16L, 16R respectively lock the distal end portions 80b of the regulation members 80UL, 80DL and the distal end portions 80b of the regulation members 80UR, 80DR arranged in the airbag 25, and are provided as a pair on the left and right and have the same configuration, so that the locking member 16L on a left side will be described as an example. The locking member 16L includes a locking pin 17 that is inserted through locking holes 82UL, 82DL formed on the distal end portions 80b of the regulation members 80UL, 80DL and locks the distal end portion 80b of each of the regulation members 80UL, 80DL, an actuator 18 that is attached on a lower surface side of the bottom wall portion 13 and operates to be able to draw the locking pin 17, and a support bracket 19 that is formed to extend downward from the bottom wall portion 13 on a side of a distal end of the locking pin 17 and can support a distal end side of the locking pin 17 (see FIG. 2). The actuator 18 is formed to operate to draw the locking pin 17 upon receiving an operation signal from the control device 85. When the actuator 18 operates to draw the locking pin 17, the locking pin 17 shifts from a state of locking the distal end portions 80b of the regulation members 80UL, 80DL to a state of releasing the locking. As the actuator 18, as long as the locking pin 17 can be moved due to the electric signal from the control device 85, a piston cylinder using a hydraulic pressure, a water pressure, an air pressure, or a fluid pressure including a case where an expanding gas pressure is generated such as an inflator, a motor using the fluid pressure or electricity, an electromagnetic solenoid, a spring using a biasing force at the time of restoration, or the like can be used. When the actuator 18 is not in operation, the distal end side of the locking pin 17 is supported by the support bracket 19 so as to prevent a portion on the distal end portions 80b of the regulation members 80UL, 80DL from coming off the locking pin 17 during locking.

As illustrated in FIGS. 4 to 7, the airbag 25 includes a bag main body 26, tethers 50, 57, 58 that are disposed inside the bag main body 26 and regulate a full inflation shape of the bag main body 26, and regulation members 80UL, 80UR, 80DL, 80DR that are arranged inside the bag main body 26.

Figure 4:
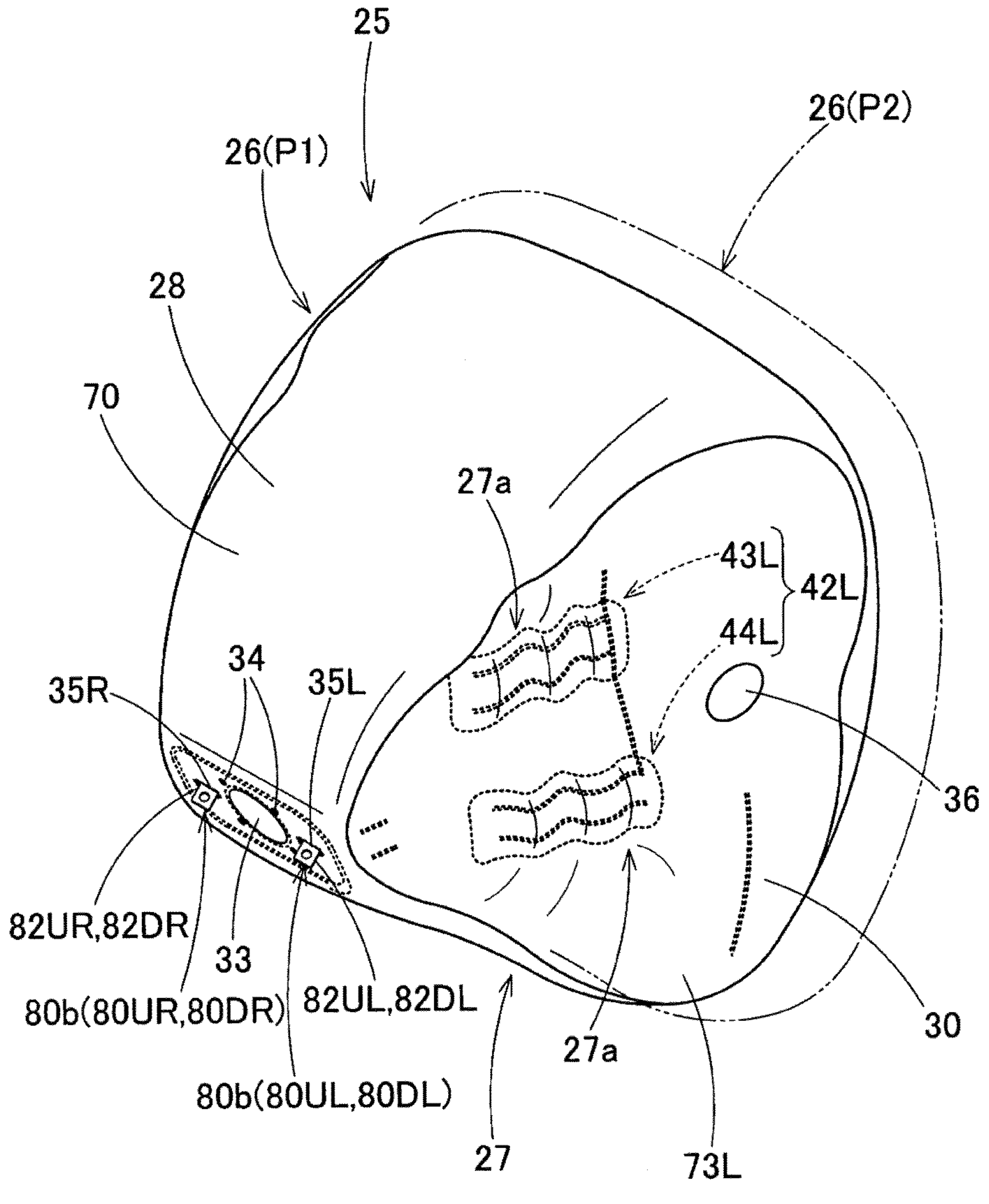
FIG. 4 is a perspective view of a state where an airbag used in the passenger seat airbag device according to the embodiment is inflated alone, illustrating a state where a peripheral wall portion is shortened (state where airbag is inflated in shortened mode)

The bag main body 26 has a bag shape formed of a sheet body having flexibility, and is disposed so as to close between the upper surface 2 of the in-panel 1 and the windshield 4 above the in-panel 1 at the time of full inflation, and the bag main body 26 has a shape at the time of full inflation of a substantially triangular prism shape whose axial direction is substantially along the left-right direction as illustrated in FIG. 4. The bag main body 26 includes an occupant-side wall portion 38 arranged on a rear end side at the time of full inflation, and a tapered peripheral wall portion 27 extending forward from a peripheral edge of the occupant-side wall portion 38 and converged to reduce a width dimension in the up-down direction toward a front end side.

The peripheral wall portion 27 is a portion that is mainly disposed so as to close between the upper surface 2 of the in-panel 1 and the windshield 4 above the in-panel 1 at the time of full inflation of the airbag 25, and includes an upper wall portion 28 and a lower wall portion 29 that are disposed to face each other in an up-down direction, and a left wall portion 30 and a right wall portion 31 that are disposed to face each other in the left-right direction. In the vicinity of a front end of the lower wall portion 29 of the peripheral wall portion 27, which is the vicinity of a front end 26a of the bag main portion 26 at the time of full inflation, the inflow opening 33 is formed to be opened in a substantially circular shape so as to allow the inflation gas to flow into the bag main body 26 and whose peripheral edge is attached to the bottom wall portion 13 of the case 12. A plurality of (four in the embodiment) attachment holes 34 for allowing the bolts 9a of the retainer 9 to be inserted and attaching the peripheral edge of the inflow opening 33 to the bottom wall portion 13 are formed in the peripheral edge of the inflow opening 33. On both left and right sides of the inflow opening 33, slit-shaped insertion holes 35L, 35R through which the distal end portions 80b of the regulation members 80UL, 80UR, 80DL, 80DR extending from peripheral wall adjusting portions 42L, 42R to be described later can be inserted are respectively formed substantially along the left-right direction (see FIGS. 4 and 8). In addition, in the left wall portion 30 and the right wall portion 31 of the peripheral wall portion 27, vent holes 36 for exhausting an excess inflation gas flowing into the bag main body 26 are formed to be opened in a substantially circular shape. In the case of the embodiment, the vent holes 36 are formed in a region behind the peripheral wall adjusting portions 42L, 42R to be described later.

The occupant-side wall portion 38 is disposed to face the occupant MP seated in the passenger seat PS at the time of full inflation of the bag main body 26, and is arranged along a substantially vertical direction on the rear end 26*b* side of the bag main body 26 which is an occupant MP side (see FIGS. 10 to 13).

In the case of the embodiment, in the peripheral wall portion 27, the peripheral wall adjusting portions 42L, 42R that are coupled to the regulation members 80UL, 80UR, 80DL, 80DR and can adjust a length in the front-rear direction of the peripheral wall portion 27 in the airbag 25 at the time of full inflation are arranged on the left wall portion 30 and the right wall portion 31 facing each other in the left-right direction (see FIGS. 4 to 7). The peripheral wall adjusting portions 42L, 42R are arranged symmetrically on the left and right sides, and in the embodiment, the peripheral wall adjusting portion 42R arranged on the right wall portion 31 will be described as an example. Regarding the peripheral wall adjusting portion 42L arranged on the left wall portion 30, "L" is added to an end of the same reference numeral and detailed description thereof will be omitted.

The peripheral wall adjusting portion 42R is arranged in the vicinity of a center of the right wall portion 31 in the front-rear direction, and in the case of the embodiment, includes an upper-side portion 43R arranged in the vicinity of an upper edge of the right wall portion 31, and a lower-side portion 44R arranged in the vicinity of a center of the right wall portion 31 in the up-down direction below the upper-side portion 43R (see FIGS. 6 and 7). The upper-side portion 43R and the lower-side portion 44R respectively include insertion ring portions 46UR, 46DR. In the case of the embodiment, three insertion ring portions 46UR and three insertion ring portions 46DR are respectively arranged side by side in the upper-side portion 43R and the lower-side portion 44R in a manner of being separated from each other in the front-rear direction. That is, in the airbag 25 according to the embodiment, a total of six insertion ring portions 46UR, 46DR are arranged on the right wall portion 31. In addition, in the embodiment, reinforcing members 75R, 76R are respectively arranged in disposition regions of the upper-side portion 43R and the lower-side portion 44R (see FIGS. 5 to 7). The upper-side portion 43R and the lower-side portion 44R (reinforcing members 75R, 76R) are arranged substantially parallel to each other such that both are substantially along the front-rear direction at the time of full inflation of the bag main body 26 in a vehicle mounted state (see FIGS. 6 to 8, 10, and 13). The lower-side portion 44R is arranged at a position substantially directly below the upper-side portion 43R at the time of full inflation of the bag main body 26 in the vehicle mounted state (see FIGS. 10 and 13). That is, as illustrated in FIG. 7, each of the insertion ring portions 46DR positioned on a lower side is disposed at a position substantially directly below each of the insertion ring portions 46UR positioned on an upper side. Each of the insertion ring portions 46UR is coupled to a loop portion 81UR arranged on a side of a base end 80*a* of the regulation member 80UR by allowing the base end 80*a* of the regulation member 80UR to be inserted. Similarly, each of the insertion ring portions 46DR disposed on the lower-side portion 44R is coupled to a loop portion 81DR disposed on the side of the base end 80*a* of the regulation member 80DR (see FIGS. 5 to 7).

Figure 5:
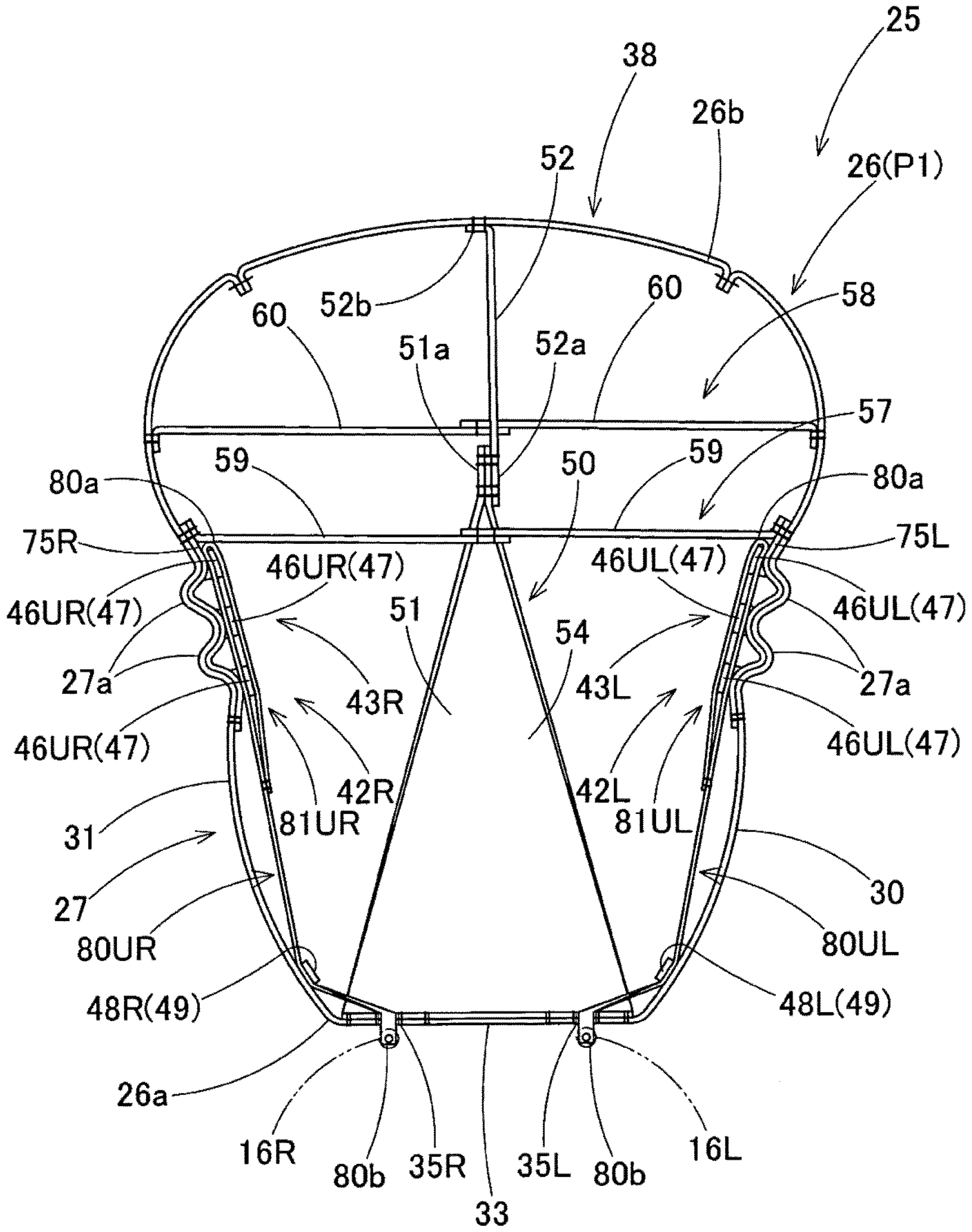
FIG. 5 is a schematic cross-sectional view of the airbag in FIG. 4 taken along the front-rear direction.

Specifically, in the case of the embodiment, the insertion ring portions 46UR, 46DR arranged on the upper-side portion 43R and the lower-side portion 44R are configured such that a band-shaped base material 47 (see FIG. 8) formed of a sheet body having flexibility is disposed substantially along the up-down direction in a state of being folded in three, and both end sides of each are sewn (joined) to the right wall portion 31 to allow the base end 80*a* of the regulation members 80UR, 80DR to be inserted between the upper-side portion 43R and the lower-side portion 44R and the right wall portion 31 (see FIG. 5). In addition, in the case of the embodiment, a separation distance of the respective insertion ring portions 46UR, 46DR in the front-rear direction is set to be slightly larger than a width dimension of the base material 47 in a state of being folded in three (that is, insertion ring portions 46UR, 46DR themselves) (see FIGS. 7 and 12).

The regulation members 80UL, 80UR, 80DL, 80DR extending from the peripheral wall adjusting portions 42L, 42R are configured to be an elongated body having flexibility, and in the case of the embodiment, are formed of a band-shaped cloth material having flexibility. The regulation members 80UL, 80UR, 80DL, 80DR are respectively arranged two by two in the up-down direction on a left wall portion 30 side and a right wall portion 31 side so as to extend from the upper-side portions 43L, 43R and the lower-side portions 44L, 44R of the peripheral wall adjusting portions 42L, 42R. Since the regulation members 80UL, 80UR, 80DL, 80DR have the same configuration, the regulation member 80UL (see section A in FIG. 9) arranged to extend from the upper-side portion 43L provided on the left wall portion 30 side will be described as an example. As illustrated in section A of FIG. 9, the regulation member 80UL is formed in a loop shape in a state where a portion on the side of the base end 80*a* is inserted through three insertion ring portions 46UL arranged in the upper-side portion 43L. That is, the regulation member 80UL includes a loop portion 81UL that couples the insertion ring portions 46UL on the side of the base end 80*a*. The locking hole 82UL through which the locking pin 17 of the locking member 16L can be inserted is formed on the side of the distal end portion 80*b* of the regulation member 80UL (see FIG. 8). A length dimension of the regulation member 80UL (length dimension L1 from end edge of loop portion 81UL to locking hole 82UL, see FIG. 8) is set to a dimension that allows the adjacent insertion ring portions 46UL, 46UL separately arranged in the front-rear direction to be pulled in a state where the adjacent insertion ring portions 46UL, 46UL are close to each other and a portion of the left wall portion 30 disposed between the adjacent insertion ring portions 46UL, 46UL is folded (a state where a tuck 27*a* is provided in the portion of the left wall portion 30 between the adjacent insertion ring portions 46UL, 46UL can be maintained) when the airbag 25 is inflated in a state where the locking pin 17 is inserted into the locking hole 82UL and the locking with the locking pin 17 is maintained. The loop portion 81UL is configured such that a length dimension L2 (see FIG. 8) in a flat deployed state is slightly larger than a separation distance L3 (see section A in FIG. 9) between edge portions of the insertion ring portions 46UL disposed on end sides in the front-rear direction in a state where the left wall portion 30 is flat deployed. That is, an inner diameter dimension of the loop portion 81UL is set to a dimension that allows the left wall portion 30 to be disposed so as to extend in the front-rear direction as a whole including a portion disposed between the insertion ring portions 46UL at the time of full inflation of the bag main body 26 in a state where the coupling between the distal end portion 80*b* of the regulation member 80UL and the locking member 16L is released.

Figure 6:
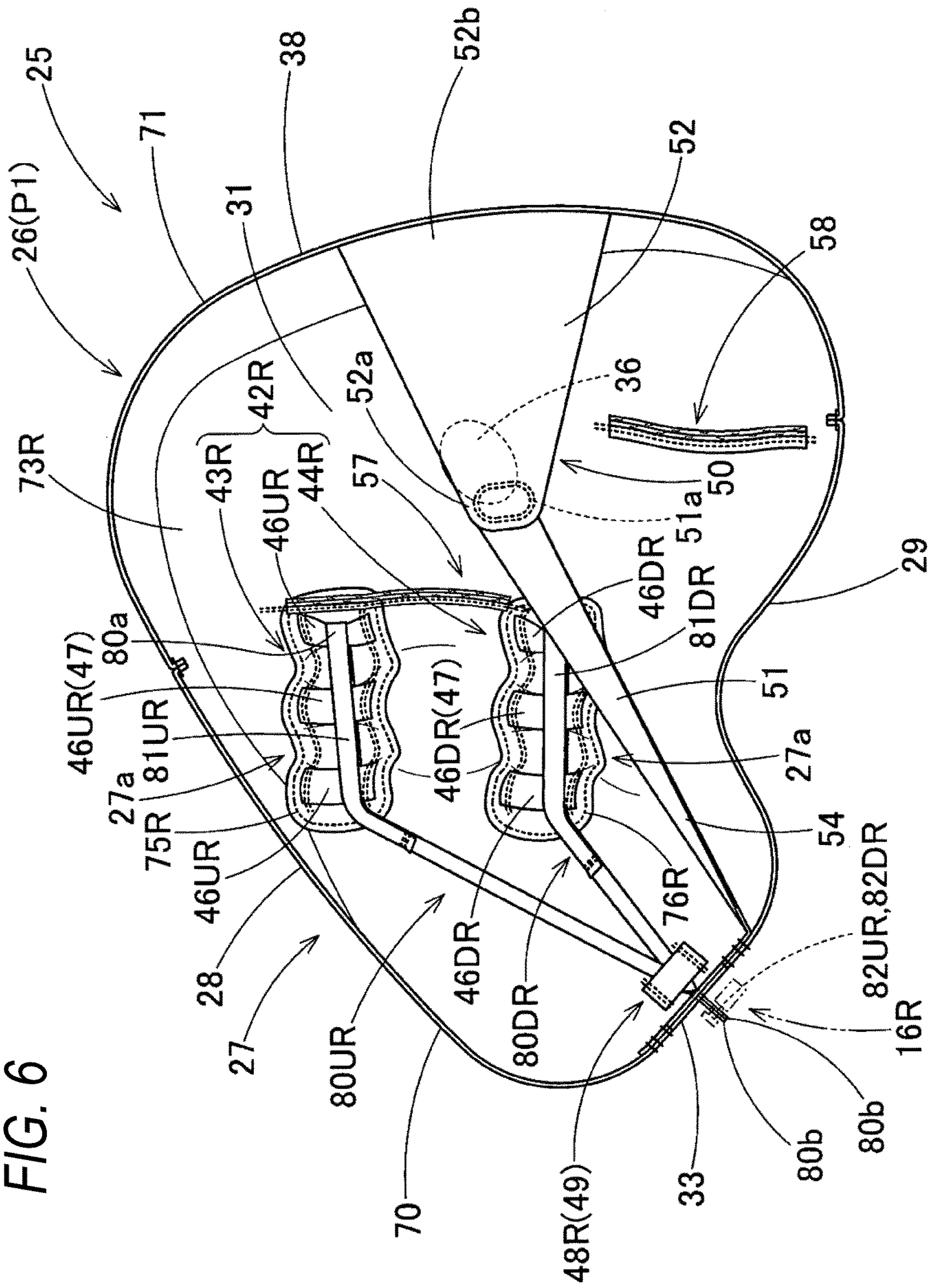
FIG. 6 is a schematic longitudinal sectional view of the airbag in FIG. 4 taken along the front-rear direction.
Figure 7:
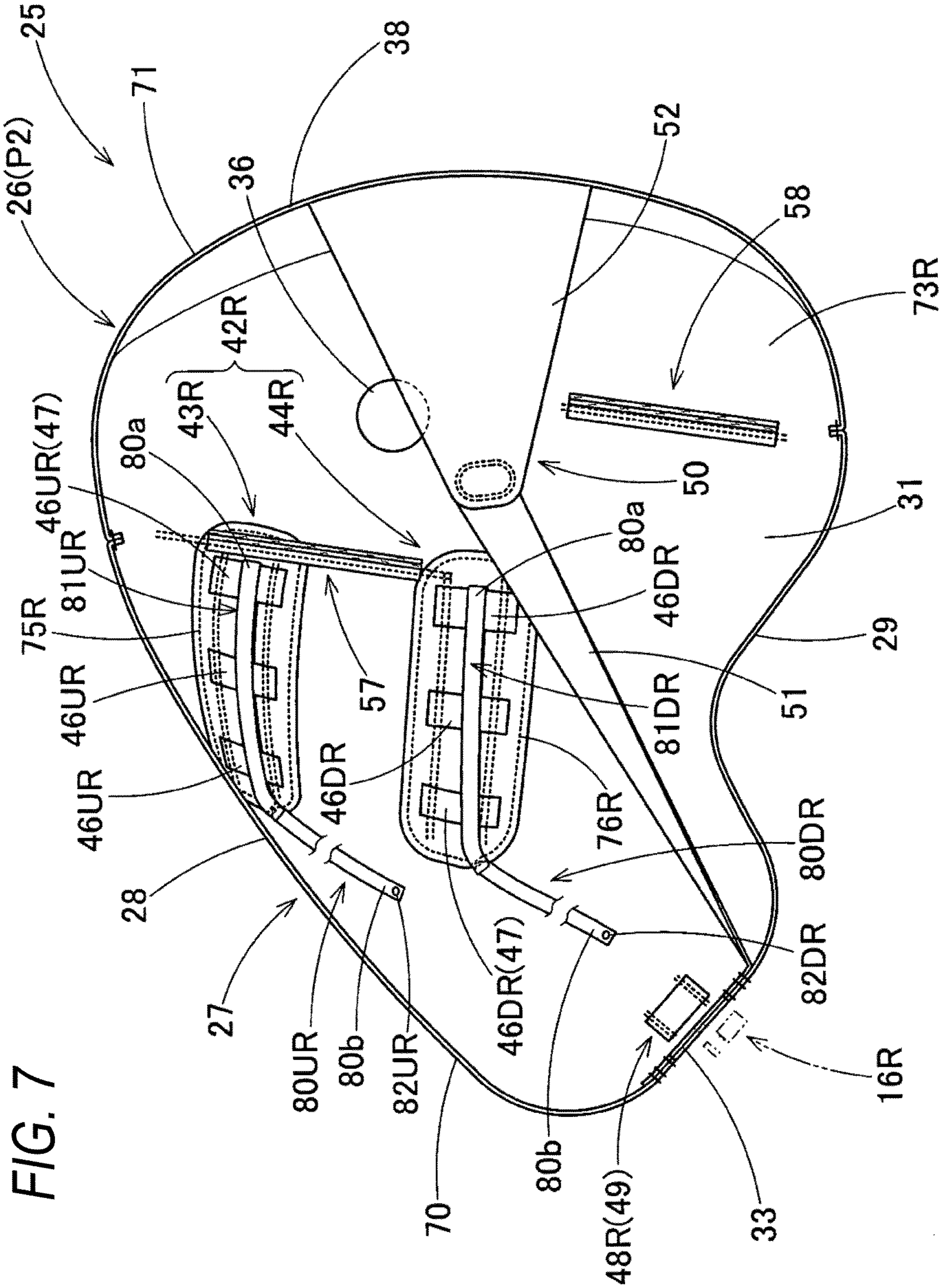
FIG. 7 is a schematic longitudinal sectional view of the airbag in FIG. 4 taken along the front-rear direction, illustrating a state where the peripheral wall portion is extended (state where airbag is inflated in extended mode)
Figure 8:
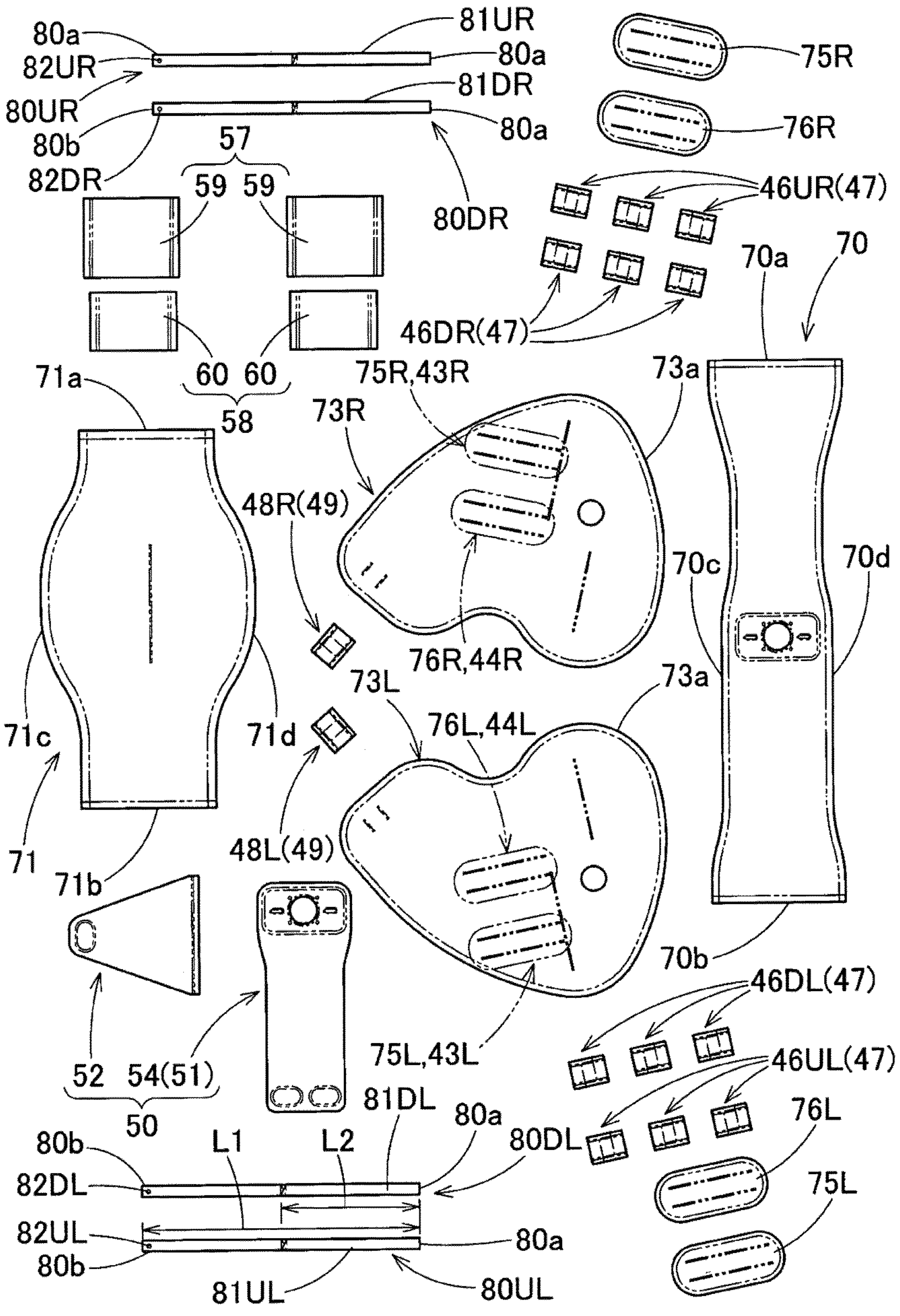
FIG. 8 is a plan view illustrating base materials constituting the airbag according to the embodiment.
Figure 9:
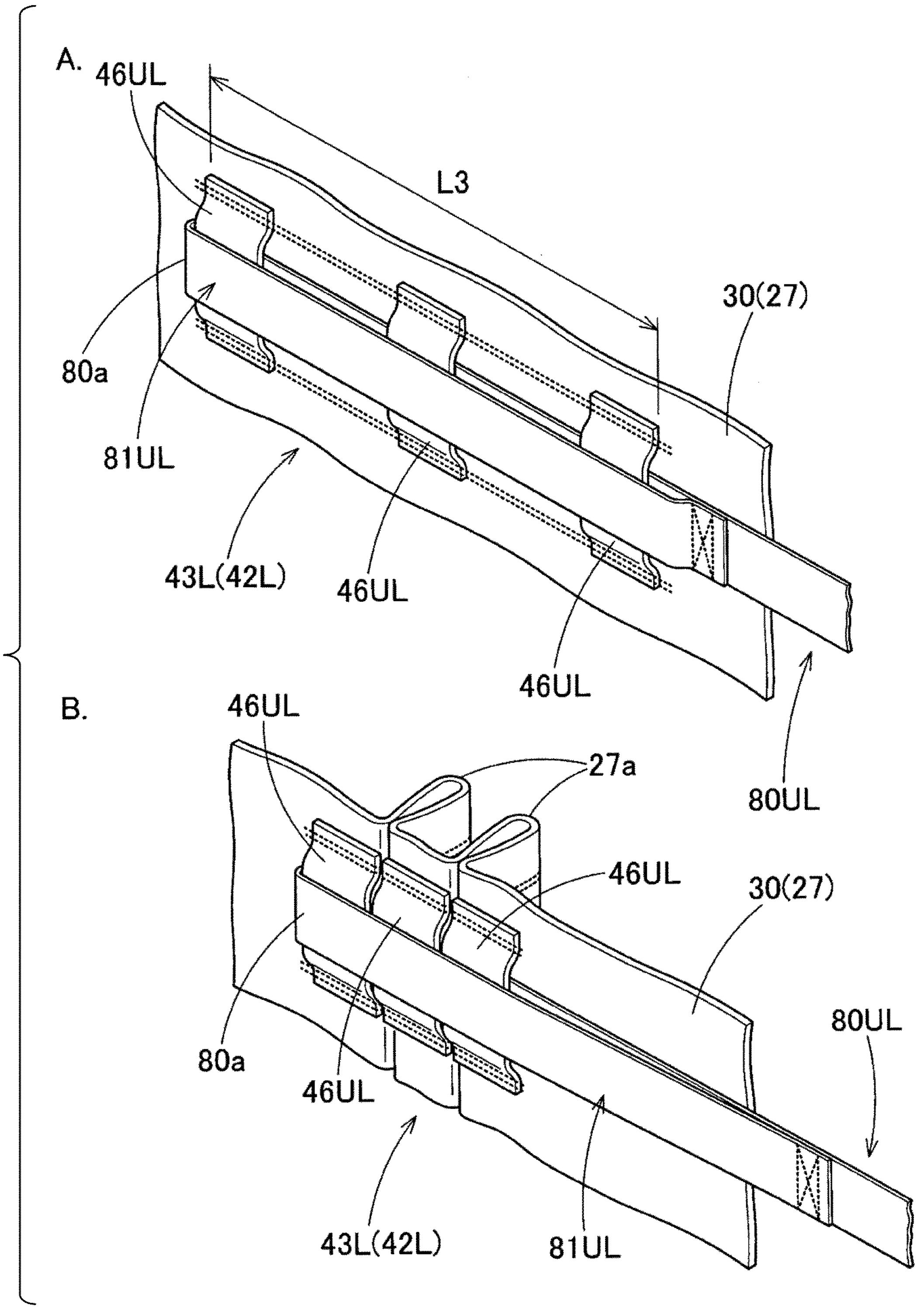
FIG. 9 is a schematic view illustrating a state where the airbag according to the embodiment is provided with tucks in the peripheral wall portion by pulling insertion ring portions by a regulation member.

In the airbag 25 according to the embodiment, on inner peripheral surface sides in the vicinity of front ends of the left wall portion 30 and the right wall portion 31 of the bag main body 26, regulating ring portions 48L, 48R through which the regulation members 80UL, 80UR, 80DL, 80DR arranged two by two in the up-down direction can be inserted are respectively provided on the left wall portion 30 side and the right wall portion 31 side so as to extend from the upper-side portions 43L, 43R and the lower-side portions 44L, 44R of the peripheral wall adjusting portions 42L, 42R (see FIGS. 5 to 7). Taking the regulating ring portion 48R provided on the right wall portion 31 side as an example, similarly to the insertion ring portions 46UR, 46DR, the regulating ring portion 48R is configured such that both end sides thereof are sewn (joined) to the right wall portion 31 to allow a region in the vicinity of the distal end portions 80*b* of the regulation members 80UR, 80DR to be inserted between the regulating ring portion 48R and the right wall portion 31 in a state where a base material 49 illustrated in FIG. 8 is folded in three (see FIGS. 5 and 6). The regulating ring portion 48R is arranged in order to allow the vicinity of the distal end portions 80*b* of the regulation members 80UR, 80DR extending from positions separated in the up-down direction to be inserted therethrough to regulate a position of the region in the vicinity of the distal end portion 80*b*, thereby allowing the distal end portion 80*b* to stably protrude from the insertion hole 35R.

In the case of the embodiment, as the tether disposed inside the bag main body 26, a front-rear tether 50 and left-right tethers 57, 58 are disposed.

The front-rear tether 50 couples a substantially center of the occupant-side wall portion 38 in the left-right direction and the front end 26*a* side of the bag main body 26, and in the case of the embodiment, is configured to couple a front-side portion 51 extending from the peripheral edge of the inflow opening 33 and a rear-side portion 52 extending from an occupant-side wall portion 38 side (see FIGS. 5 to 7). In the case of the embodiment, the front-side portion 51 is formed by folding a part of a band-shaped front-side portion base material 54 illustrated in FIG. 8 to allow a rear edge to be along the up-down direction. The rear-side portion 52 is configured to have an outer shape of a substantially trapezoidal shape having a narrow width on a front end 52*a* side coupled to the front-side portion 51. A rear end 52*b* of the rear-side portion 52 is coupled to the vicinity of a center of the occupant-side wall portion 38 in the up-down and left-right directions. The front-rear tether 50 couples the vicinity of the center of the occupant-side wall portion 38 in the up-down and left-right directions and a peripheral edge portion of the inflow opening 33 at the time of full inflation of the airbag 25, and is arranged in order to prevent excessive rearward protrusion of the occupant-side wall portion 38 at an initial stage of inflation of the airbag 25 and rearward movement of the occupant-side wall portion 38 (increase in separation distance between vicinity of inflow opening 33 and occupant-side wall portion 38) at the time of full inflation.

In the case of the embodiment, as illustrated in FIGS. 6 and 7, the left-right tethers 57, 58 are disposed at two positions above and below the front-rear tether 50, couple the left wall portion 30 and the right wall portion 31, respectively, and are arranged substantially along the left-right direction at the time of full inflation of the bag main body 26 (see FIG. 5). In the case of the embodiment, the left-right tether 57 arranged on the upper side is arranged at a position that is in the vicinity of the rear side of the peripheral wall adjusting portions 42L, 42R and is on a front side of the vent hole 36 (position between peripheral wall adjusting portions 42L, 42R and vent hole 36). The left-right tether 58 arranged on the lower side is arranged at a position substantially directly below the vent hole 36. The left-right tethers 57, 58 are formed of two band-shaped tether base materials 59 and two band-shaped tether base materials 60, respectively (see FIGS. 5 and 8). The left-right tethers 57, 58 are arranged in order to prevent an excessive separation between the left wall portion 30 and the right wall portion 31 at the initial stage of inflation of the airbag 25 and to prevent an increase in the width dimension (separation distance between left wall portion 30 and right wall portion 31) of the bag main body 26 in the left-right direction at the time of full inflation.

The bag main body 26 is formed in a bag shape by joining peripheral edges of base materials having a predetermined shape to each other. In the case of the embodiment, the bag main body 26 is configured from a front panel portion 70, a rear panel portion 71, a left panel portion 73L, and a right panel portion 73R as illustrated in FIG. 8.

The front panel portion 70 mainly constitutes a region between the upper wall portion 28 and the lower wall portion 29 of the peripheral wall portion 27, and as illustrated in FIG. 8, has an outer shape of a substantially band shape which is substantially bilaterally symmetrical. The rear panel portion 71 mainly constitutes a region of the occupant-side wall portion 38 (specifically, region including rear end side of upper wall portion 28 and rear end side of lower wall portion 29 of occupant-side wall portion 38), and as illustrated in FIG. 8, has an outer shape of a substantially band shape which is substantially bilaterally symmetrical. The left panel portion 73L and the right panel portion 73R constitute the left wall portion 30 and the right wall portion 31, respectively, and are provided as a pair on the left and right.

In the embodiment, the front panel portion 70, the rear panel portion 71, the left panel portion 73L, the right panel portion 73R, the reinforcing members 75L, 75R, 76L, and 76R, the base materials 47 and 49 constituting the insertion ring portions 46UL, 46UR, 46DL, 46DR and the regulating ring portions 48L, 48R, and the front-side portion base material 54, the rear-side portion 52, and the tether base materials 59 and 60 constituting the front-rear tether 50 and the left-right tethers 57, 58 that form the bag main body 26 are each formed of a flexible woven fabric made of polyester yarn, polyamide yarn, or the like. In addition, in the embodiment, the regulation members 80UL, 80UR, 80DL, 80DR are also formed of a flexible woven fabric made of polyester yarn, polyamide yarn, or the like similarly to the bag main body 26.

The bag main body 26 according to the embodiment is formed in a bag shape by sewing (joining) corresponding edge portions of the front panel portion 70, the rear panel portion 71, the left panel portion 73L, and the right panel portion 73R to each other using a sewing thread. An upper rear edge 70*a* of the front panel portion 70 is sewn to an upper edge 71*a* of the rear panel portion 71, and a lower rear edge 70*b* of the front panel portion 70 is sewn to a lower edge 71*b* of the rear panel portion 71. An outer peripheral edge 73*a* of the left panel portion 73L is sewn to left edges 70*c*, 71*c* of the front panel portion 70 and the rear panel portion 71, and an outer peripheral edge 73*a* of the right panel portion 73R is sewn to right edges 70*d*, 71*d* of the front panel portion 70 and the rear panel portion 71.

Next, mounting of the airbag device M according to the embodiment on the vehicle will be described. First, the airbag 25 is folded so as to be stored in the case 12 in a state where the retainer 9 is stored inside. Although not illustrated in detail, the airbag 25 is folded so as to reduce width dimensions in the front-rear and left-right directions from a state of a preliminary folded bag. In the embodiment, although not illustrated in detail, a part of a region of the peripheral wall portion 27 is folded when the preliminary folded bag is formed. Specifically, as schematically illustrated in sections A and B of FIG. 9, in disposition regions of the peripheral wall adjusting portions 42L, 42R on the left wall portion 30 and the right wall portion 31, portions between the insertion ring portions 46UL, 46UR, 46DL, 46DR are folded with a folding line along a length direction of the insertion ring portions 46UL, 46UR, 46DL, 46DR so as to bring the insertion ring portions 46UL, 46UR, 46DL, 46DR close to each other. More specifically, as schematically illustrated in section B of FIG. 9, the left wall portion 30 (right wall portion 31) is folded such that a portion between the insertion ring portions 46UL (46UR, 46DL, 46DR) protrudes outward to form the tuck 27*a*. The airbag 25 is folded in a state where such a folded state is maintained. That is, in the embodiment, although not illustrated in detail, the airbag 25 is folded in a state where the tuck 27*a* extending in the up-down direction is provided at two positions in the front-rear direction in regions of the left wall portion 30 and the right wall portion 31.

After completing folding the airbag 25, a periphery of the formed folded-up body is wrapped with a breakable wrapping sheet (not illustrated) so as to avoid folding collapse. In this case, the distal end portions 80*b* of the regulation members 80UL, 80UR, 80DL, 80DR extending from the peripheral wall adjusting portions 42L, 42R protrude from the insertion holes 35L, 35R formed in the bag main body 26, respectively. Then, the folded airbag 25 is stored in the case 12 to which the locking members 16L, 16R are attached in advance such that the bolts 9*a* protrude from the bottom wall portion 13. Thereafter, each locking pin 17 of each of the locking members 16L, 16R is inserted through the locking holes 82UL, 82UR, 82DL, 82DR of the regulation members 80UL, 80UR, 80DL, 80DR protruding from each through hole 13*a* formed in the bottom wall portion 13, and the distal end of the locking pin 17 is supported by the support bracket 19, thereby locking the distal end portions 80*b* of the regulation members 80UL, 80UR, 80DL, 80DR by the locking members 16L, 16R. Next, the main body portion 8*a* of the inflator 8 is inserted into the case 12 from below the bottom wall portion 13, and the bolts 9*a* of the retainer 9 protruding downward from the bottom wall portion 13 are inserted through the flange portion 8*c* of the inflator 8. Thereafter, by fastening the nuts 10 to the bolts 9*a* protruding from the flange portion 8*c* of the inflator 8, the folded airbag 25 and the inflator 8 can be attached to the case 12.

Thereafter, the peripheral wall portion 14 of the case 12 is locked to the coupling wall portion 6*c* of the airbag cover 6 in the in-panel 1 mounted on the vehicle, the bracket (not illustrated) provided on the case 12 is fixed to the body side of the vehicle, and the inflator 8 and the locking members 16L, 16R are electrically connected to the control device 85, thereby enabling the airbag device M to be mounted on the vehicle.

Figure 10:
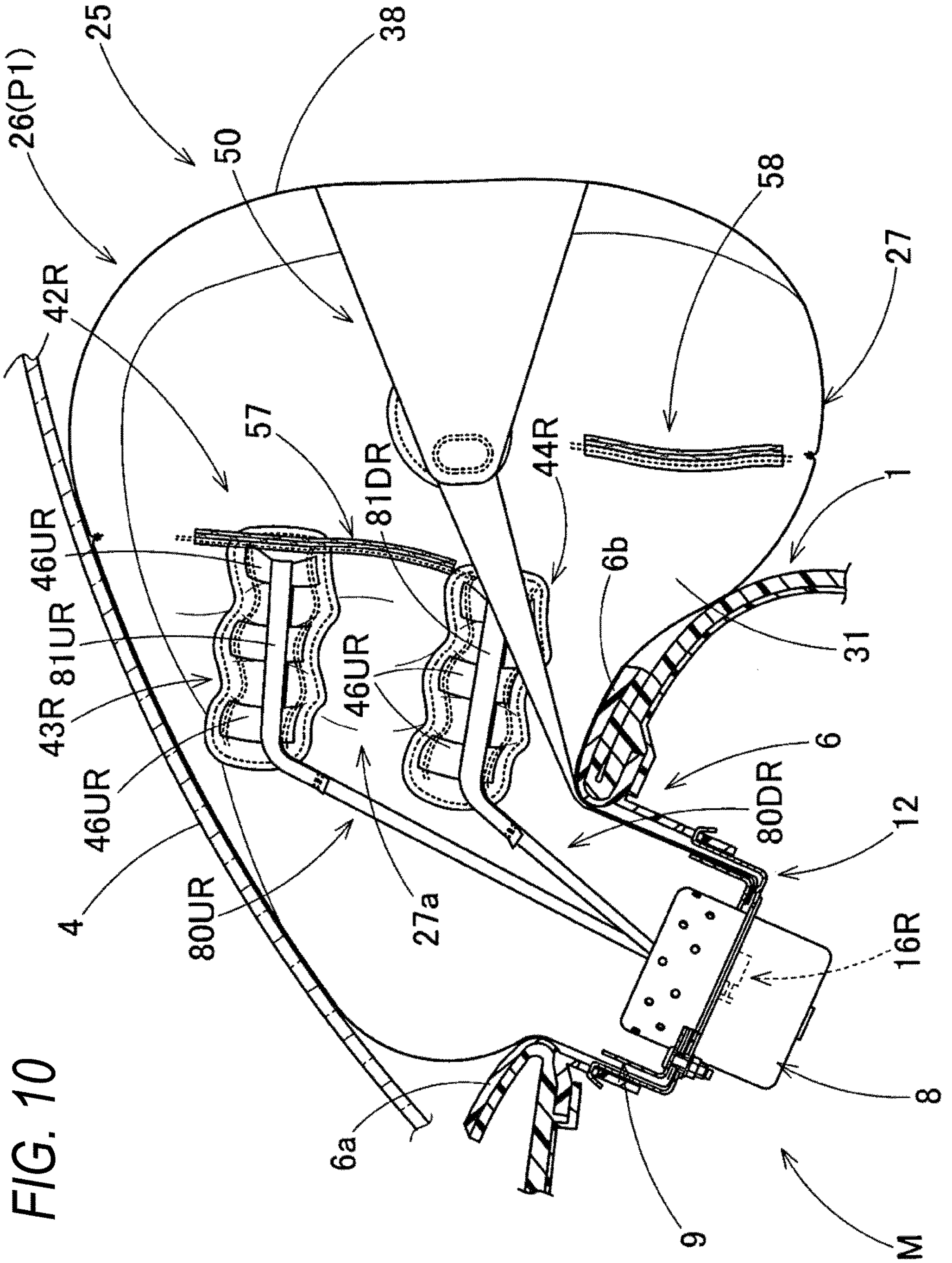
FIG. 10 is a schematic longitudinal sectional view taken along the front-rear direction illustrating a state where the airbag is fully inflated in the shortened mode in the passenger seat airbag device according to the embodiment.
Figure 11:
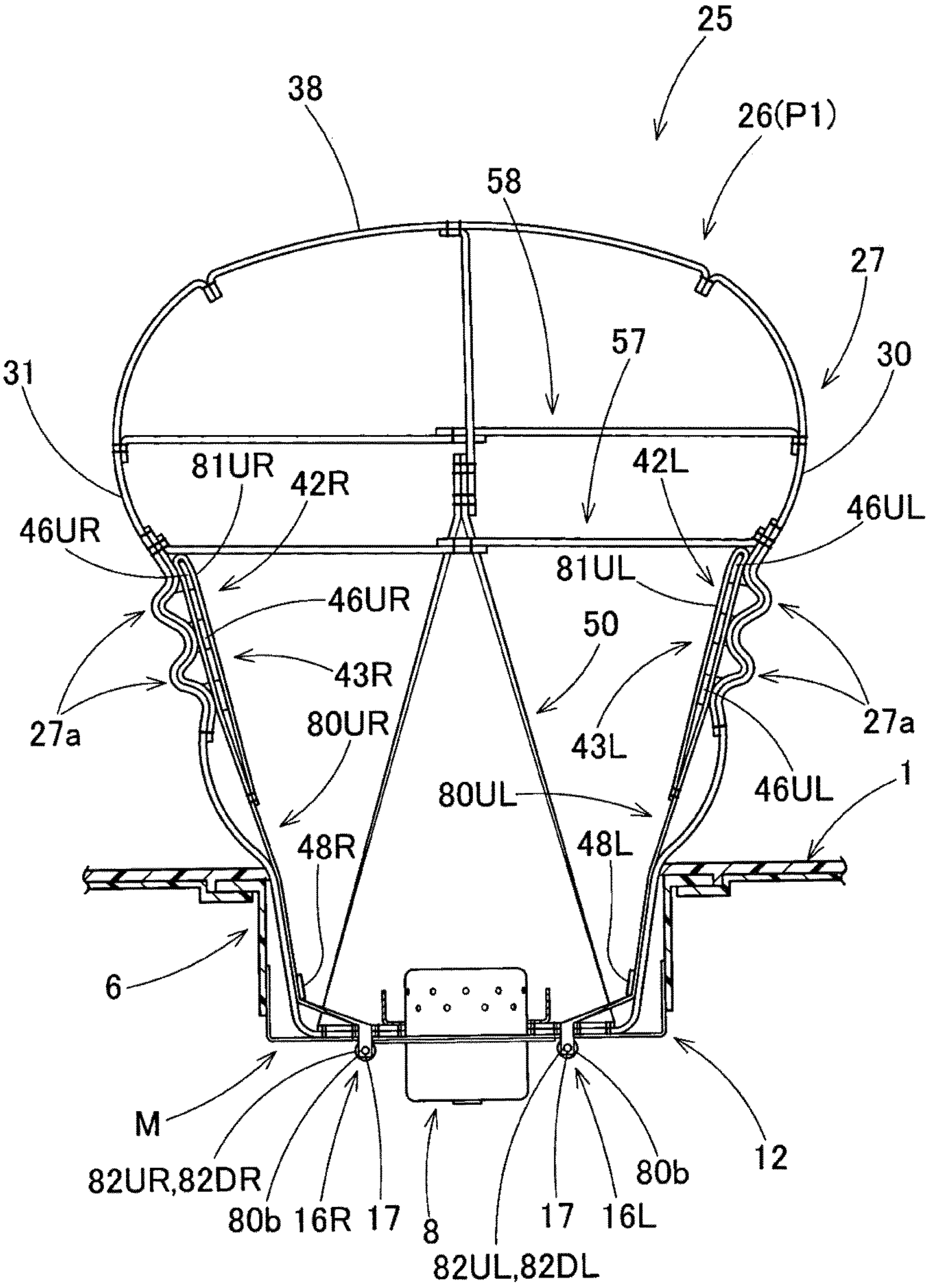
FIG. 11 is a schematic cross-sectional view taken along the front-rear direction illustrating the state where the airbag is fully inflated in the shortened mode in the passenger seat airbag device according to the embodiment.
Figure 12:
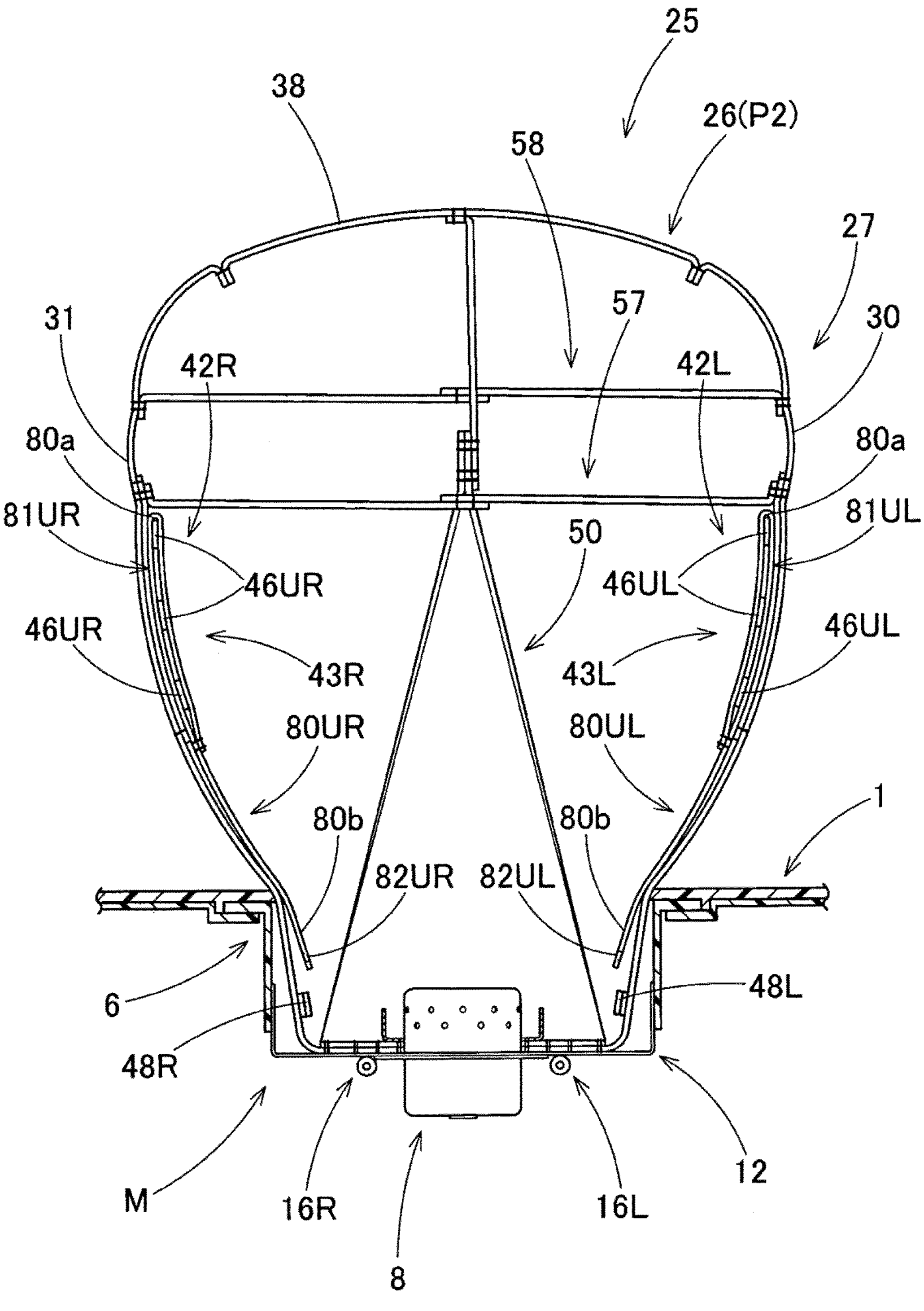
FIG. 12 is a schematic cross-sectional view taken along the front-rear direction illustrating a state where the airbag is fully inflated in the extended mode in the passenger seat airbag device according to the embodiment.
Figure 13:
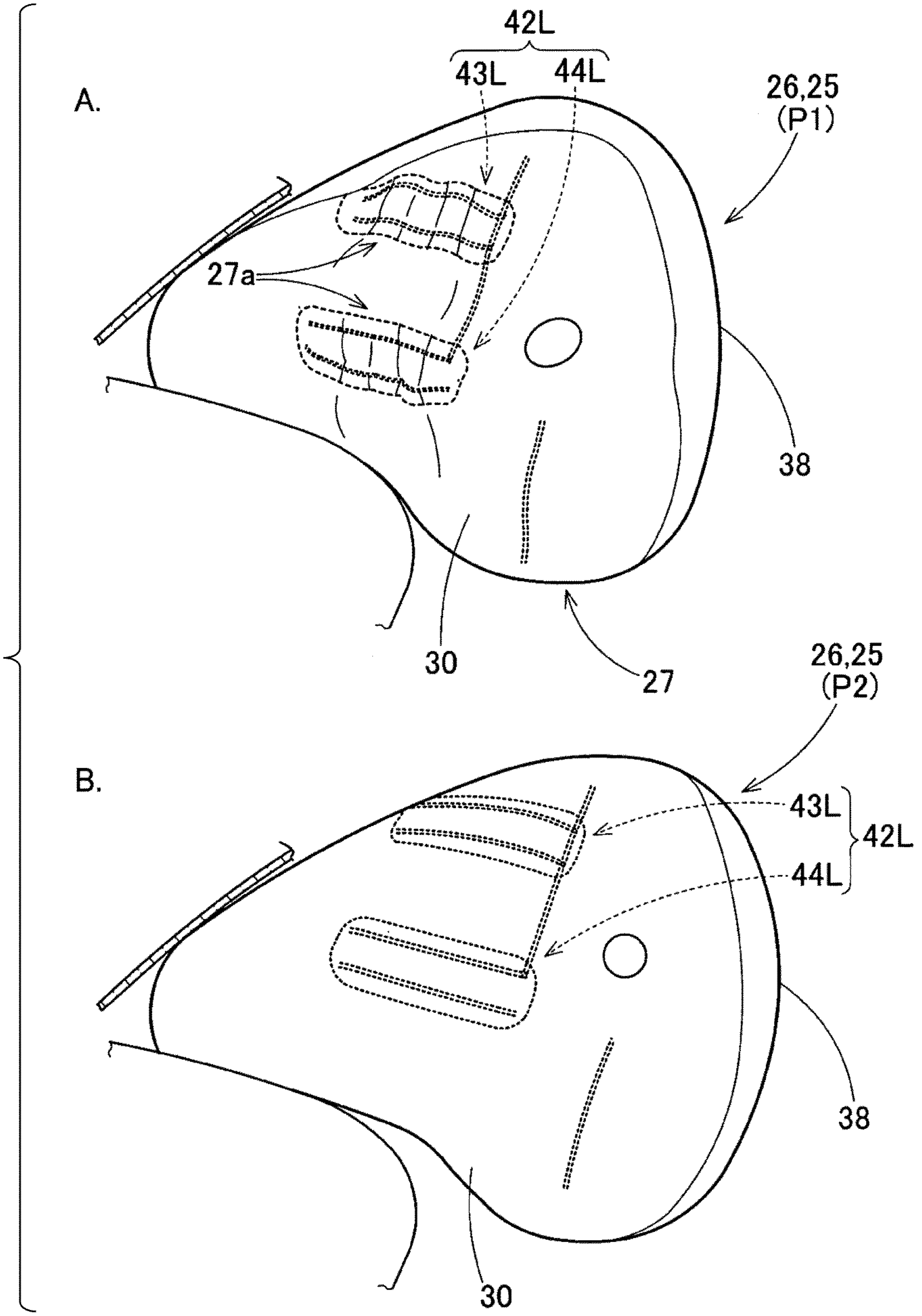
FIG. 13 is a schematic side view of the airbag at the time of full inflation in the passenger seat airbag device according to the embodiment, illustrating a state in the shortened mode and a state in the extended mode.

When a front surface collision of the vehicle is detected after the airbag device M is mounted on the vehicle, the control device 85 outputs an operation signal to the inflator 8, the inflator 8 discharges the inflation gas from the gas discharge port 8*b*, the airbag 25 is inflated by causing the inflation gas to flow into the airbag 25, and the door portions 6*a*, 6*b* of the airbag cover 6 are pushed open. Then, the airbag 25 protrudes upward from the case 12 through an opening formed by push opening the door portions 6*a*, 6*b* of the airbag cover 6 to open, and is deployed and inflated while protruding toward the rear side of the vehicle, thereby completing the inflation so as to close between the upper surface 2 of the in-panel 1 and the windshield 4 above the in-panel 1 as indicated by a two-dot chain line in FIG. 1 and as illustrated in FIGS. 10 and 13.

In the airbag device M according to the embodiment, when coupling between the regulation members 80UL, 80UR, 80DL, 80DR and the locking members 16L, 16R serving as the control mechanism is maintained, the bag main body 26 is fully inflated in a state where portions of the peripheral wall portion 27 disposed between the insertion ring portions 46UL, 46UR, 46DL, 46DR are folded by the loop portions 81UL, 81UR, 81DL, 81DR provided on the side of the base end 80*a* of the regulation members 80UL, 80UR, 80DL, 80DR (such that insertion ring portions 46UL, 46UR, 46DL, 46DR are close to each other). That is, in the airbag device M according to the embodiment, in a state where the coupling between the regulation members 80UL, 80UR, 80DL, 80DR and the locking members 16L, 16R is maintained, the airbag 25 is fully inflated in the state where the tuck 27*a* are provided along the up-down direction at an intermediate portion of the peripheral wall portion 27 (left wall portion 30 and right wall portion 31 in embodiment) in the front-rear direction. In the airbag 25 according to the embodiment, the tuck 27*a* formed when the airbag 25 is folded is disposed while the folded state being loosen but maintained to some extent, when the airbag 25 is inflated in a state where the coupling between the regulation members 80UL, 80UR, 80DL, 80DR and the locking members 16L, 16R is maintained (see FIGS. 10 and 11, and section A of FIG. 13). Since such tucks 27*a* are formed on both sides (left wall portion 30 and right wall portion 31) of the peripheral wall portion 27 of the bag main body 26 facing each other in the up-down direction or the left-right direction (left-right direction in embodiment), a width dimension of the peripheral wall portion 27 in the front-rear direction at the time of full inflation can be reduced in a well-balanced manner on both left and right sides, and even in a configuration that the bag main body 26 is fully inflated in the state where the tucks 27*a* are provided on a part of the peripheral wall portion 27, the occupant-side wall portion 38 disposed on the rear end side at the time of full inflation can be disposed to face the occupant MP while preventing occurrence of inclination or the like, and the occupant MP can be stably received. In addition, in the state where the coupling between the regulation members 80UL, 80UR, 80DL, 80DR and the locking members 16L, 16R is released, the bag main body 26 is fully inflated in the state where the portions of the peripheral wall portion 27 disposed between the insertion ring portions 46UL, 46UR, 46DL, 46DR are deployed in the front-rear direction (extended in front-rear direction) (see FIG. 12 and section B in FIG. 13), and thus a position of the occupant-side wall portion 38 at the time of full inflation can be positioned on the rear side as compared with the case where the bag main body 26 is inflated in a state where the coupling between the regulation members 80UL, 80UR, 80DL, 80DR and the locking members 16L, 16R is maintained (see two-dot chain line in FIG. 1, and sections A and B in FIG. 13). Of course, even in the airbag 25 fully inflated in the state where the coupling between the regulation members 80UL, 80UR, 80DL, 80DR and the locking members 16L, 16R is released, the occupant MP can be stably received by the occupant-side wall portion 38 disposed in front of the occupant MP.

Therefore, in the airbag device M according to the embodiment, even when the airbag device M is configured to have different inflation modes, the occupant MP can be stably protected by the airbag 25 fully inflated.

Specifically, in the airbag device M according to the embodiment, in a case where the control device 85 that inputs a signal from predetermined sensors 86, 87, 88 detects, for example, that an occupant MP1 of a small physique is seated or that the occupant MP is seated at a position close to the in-panel 1, the airbag 25 is inflated by causing the inflation gas to flow therein by the operation of the inflator 8 in a state where the operation signal is not output to each actuator 18 of the locking members 16L, 16R. That is, the airbag 25 is fully inflated in a state where the tucks 27*a* are provided on the peripheral wall portion 27 (left wall portion 30 and right wall portion 31) (state where folded state of tuck 27*a* is maintained) (shortened mode P1 in which width dimension of peripheral wall portion 27 in front-rear direction is reduced) while the coupling between the regulation members 80UL, 80UR, 80DL, 80DR and the locking members 16L, 16R is maintained (see FIGS. 10, 11, and section A in FIG. 13). Therefore, the occupant MP seated relatively close to the in-panel 1 and the occupant MP1 of a small physique can be properly received by the occupant-side wall portion 38 positioned on a relatively front side of the airbag 25 at the time of full inflation in the shortened mode.

In contrast, for example, in a case where the control device 85 detects that an occupant MP2 of a large physique is seated or detects that the occupant MP is seated at a position away from the in-panel 1, in the airbag device M according to the embodiment, the airbag 25 is inflated in a state where the operation signal is output to each actuator 18 of the locking members 16L, 16R substantially simultaneously with the operation of the inflator 8. That is, the airbag 25 is fully inflated in a state (extended mode P2) where the coupling between the regulation members 80UL, 80UR, 80DL, 80DR and the locking members 16L, 16R is released and the peripheral wall portion 27 (left wall portion 30 and right wall portion 31) is extended in the front-rear direction over the entire region (see FIG. 12 and section B in FIG. 13). Therefore, the occupant MP seated away from the in-panel 1 and the occupant MP2 of a large physique can be properly received by the occupant-side wall portion 38 positioned on a relatively rear side of the airbag 25 at the time of full inflation.

In the airbag device M according to the embodiment, the insertion ring portions 46UL, 46UR, 46DL, 46DR are arranged on the left wall portion 30 and the right wall portion 31 so as to face each other in the left-right direction on the inner peripheral surface side of the peripheral wall portion 27. That is, in the airbag device M according to the embodiment, since the insertion ring portions 46UL, 46UR, 46DL, 46DR are arranged in a region that does not contact the windshield 4 arranged above the airbag 25 at the time of full inflation or the in-panel 1 arranged below the airbag 25, when the airbag 25 is inflated in a state where the coupling between the regulation members 80UL, 80UR, 80DL, 80DR and the locking members 16L, 16R is maintained, the regulation members 80UL, 80UR, 80DL, 80DR are not affected by the windshield 4 or the in-panel 1, and the tucks 27*a* can be stably provided in the region (left wall portion 30 and right wall portion 31) of the peripheral wall portion 27. If such a viewpoint is not taken into consideration, an airbag having a configuration in which insertion ring portions are arranged on an upper wall portion and a lower wall portion that face each other in an up-down direction at the time of full inflation may be used.

Further, in the airbag device M according to the embodiment, since six of the insertion ring portions 46UL, 46UR, 46DL, 46DR are disposed on the left wall portion 30 and the right wall portion 31 (three each in front-rear direction in a manner of two rows in up-down direction), respectively, when the airbag is inflated in the shortened mode, the tucks 27*a* are respectively formed long in the up-down direction in the left wall portion 30 and the right wall portion 31 so as to extend in the up-down direction, and every two pieces of which are disposed in the front-rear direction. Therefore, the peripheral wall portion 27 (left wall portion 30 and right wall portion 31) can be maintained in a shortened state widely and stably in the up-down direction. Of course, the number of the insertion ring portions to be disposed is not limited to that in the embodiment, and at least two insertion ring portions may be disposed in regions facing each other in the up-down direction or the left-right direction, with one at the front and one at the rear.

What is claimed is:

1. A passenger seat airbag device, comprising:

an airbag that is disposed in front of an occupant seated in a passenger seat and is folded and stored in a storage portion;

an inflator that supplies an inflation gas to the airbag; and a control mechanism that controls an inflation shape of the airbag, wherein the airbag is configured to include:

a bag main body formed in a bag shape having flexibility, and configured to have an occupant-side wall portion disposed to face the occupant on a rear end side at a time of full inflation, and a peripheral wall portion extending from a peripheral edge of the occupant-side wall portion and converged toward a front end side, in which an inflow opening for allowing the inflation gas to flow into an inside of the bag main body is arranged on a front end side of the peripheral wall portion, and a peripheral edge of the inflow opening is attached to a side of the storage portion;

a plurality of regulation members, each regulation member configured to be an elongated body having flexibility, and disposed in the bag main body to regulate an inflation shape of the bag main body, wherein at least two insertion ring portions through which a base end portion of a corresponding regulation member of the plurality of regulation members is configured to be inserted are provided at each of at least two positions facing each other in an up-down direction or a left-right direction, on an inner peripheral surface side of the peripheral wall portion, in which the insertion ring portions provided on one side in the up-down direction or the left-right direction are arranged to be separated from each other in a front-rear direction, at least two regulation members of the plurality of regulation members are arranged to face each other in the up-down direction or the left-right direction, corresponding to the insertion ring portions, and in each regulation member of the plurality of regulation members, a loop portion that couples the respective insertion ring portions by forming a loop shape in a state of being inserted through the respective insertion ring portions separately arranged in the front-rear direction is provided on a side of the base end portion, and a distal end portion of each regulation member of the plurality of regulation members is coupled to the control mechanism disposed in a vicinity of the inflow opening, and when the bag main body is inflated in a state where coupling between each regulation member of the plurality of regulation members and the control mechanism is maintained, the loop portion of each regulation member of the plurality of regulation members is configured to pull the respective insertion ring portions separately arranged in the front-rear direction in a state where adjacent insertion ring portions of the respective insertion ring portions are close to each other and a portion of the peripheral wall portion disposed between the adjacent insertion ring portions is folded, and at the time of full inflation of the bag main body in a state where the coupling between each regulation member of the plurality of regulation members and the control mechanism is released, the portion of the peripheral wall portion disposed between the adjacent insertion ring portions is configured to be deployed in the front-rear direction.

2. The passenger seat airbag device according to claim 1, wherein the insertion ring portions are arranged on the inner peripheral surface side of the peripheral wall portion to face each other in the left-right direction.

* * * * *